United States Patent [19]

Nickley

[11] Patent Number: 4,529,371
[45] Date of Patent: Jul. 16, 1985

[54] MOLD CHANGER FOR A PRESS PREFERABLY AN INJECTION MOLDING MACHINE

[75] Inventor: Thomas A. Nickley, Milford, Ohio

[73] Assignee: Cincinnati Milacron Inc., Cincinnati, Ohio

[21] Appl. No.: 617,869

[22] Filed: Jun. 6, 1984

[51] Int. Cl.³ .............................. B29C 1/00; B29F 1/00
[52] U.S. Cl. ..................................... 425/186; 100/918; 425/190; 425/195; 425/542
[58] Field of Search ................ 100/918; 425/542, 575, 425/183, 186, 190, 192 R, 193, 195; 72/446, 448; 164/312, 342, 339

[56] References Cited

U.S. PATENT DOCUMENTS

| 2,543,498 | 2/1951 | Japikse | 100/918 |
| 3,142,093 | 7/1964 | Tribbett | 100/918 |
| 3,230,869 | 1/1966 | Wilkins | 100/918 |
| 3,368,479 | 2/1968 | Gregorovich | 100/918 |
| 3,738,284 | 6/1973 | Atsuta et al. | 100/918 |
| 3,782,874 | 1/1974 | Hehl | 425/190 |
| 3,942,431 | 3/1976 | Goff | 100/918 |
| 4,152,978 | 5/1979 | Abe et al. | 100/918 |
| 4,417,511 | 11/1983 | Ikeoka | 100/918 |
| 4,449,907 | 5/1984 | Yonezawa | 425/183 |
| 4,462,783 | 7/1984 | Hehl | 425/186 |
| 4,472,127 | 9/1984 | Cyriax et al. | 425/542 |
| 4,473,346 | 9/1984 | Hehl | 425/186 |

Primary Examiner—Willard E. Hoag
Attorney, Agent, or Firm—Daniel P. Worth

[57] ABSTRACT

A mold changer for an injection molding machine has a carriage with two mold stations mounted next to the molding machine. The carriage is movable parallel to the tie rods (or platen movement) of the molding machine to position a selected work station in register for mold changing. There are rollers on the machine platens and at each carriage work station to support the mold weight while permitting lateral movement of the mold into or out of the machine or carriage as part of mold changing. Separate drive means to power such lateral mold movement are on each of the machine and carriage. Each of the drive means selectively moves a mold the first part of the way from the device in which it is mounted (i.e. machine or carriage) into the other device (carriage or machine) and at some point the drive means in the receiving device assumes driving and completion of the mold change. The mold is constructed and arranged to engage and disengage the drive means.

18 Claims, 12 Drawing Figures

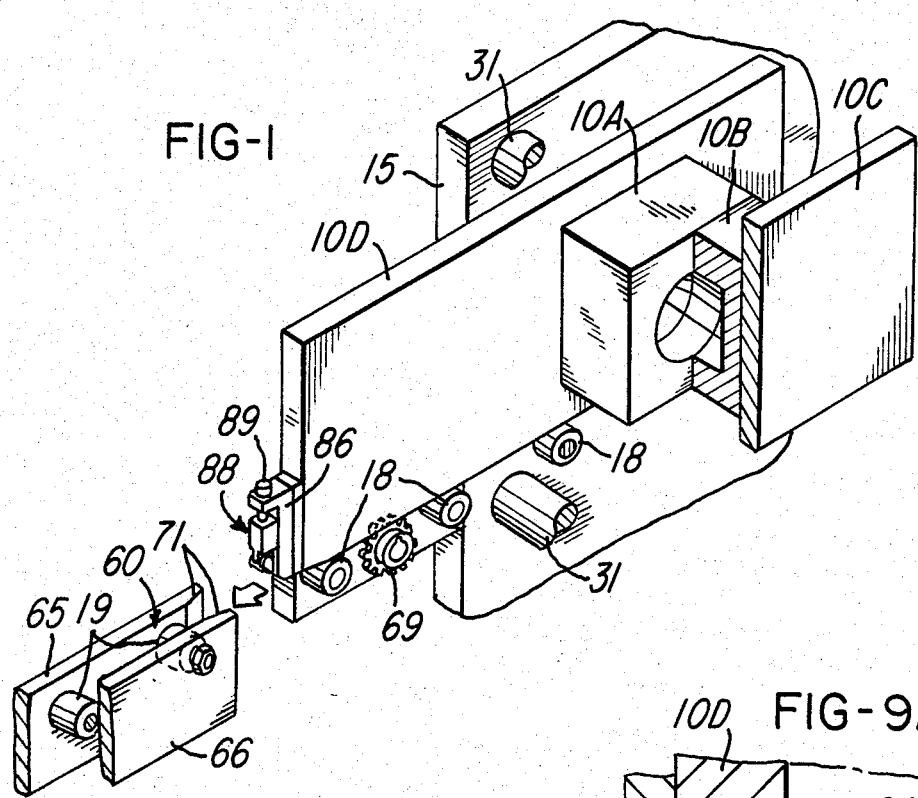
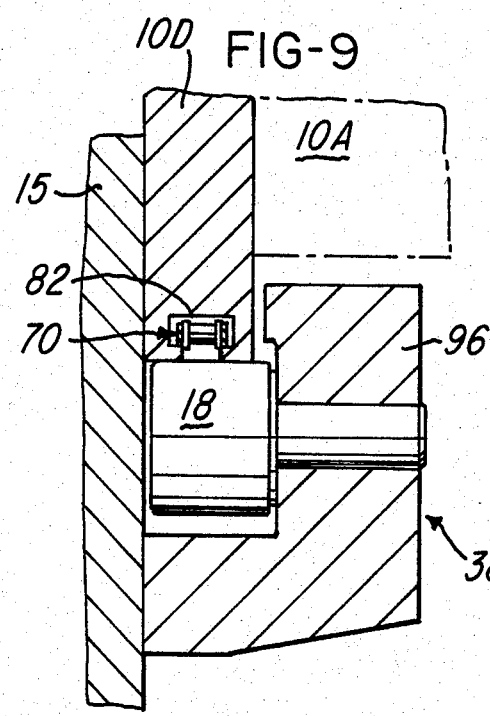
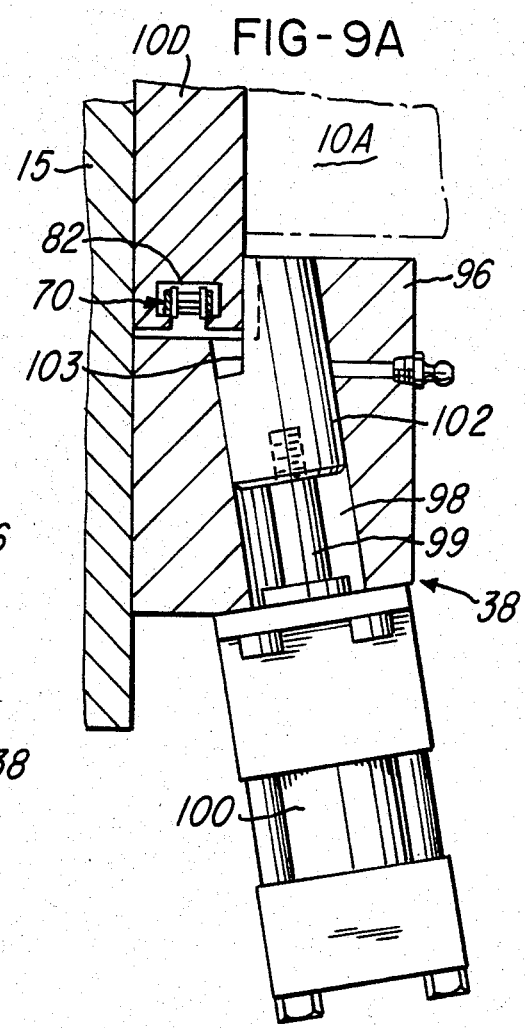

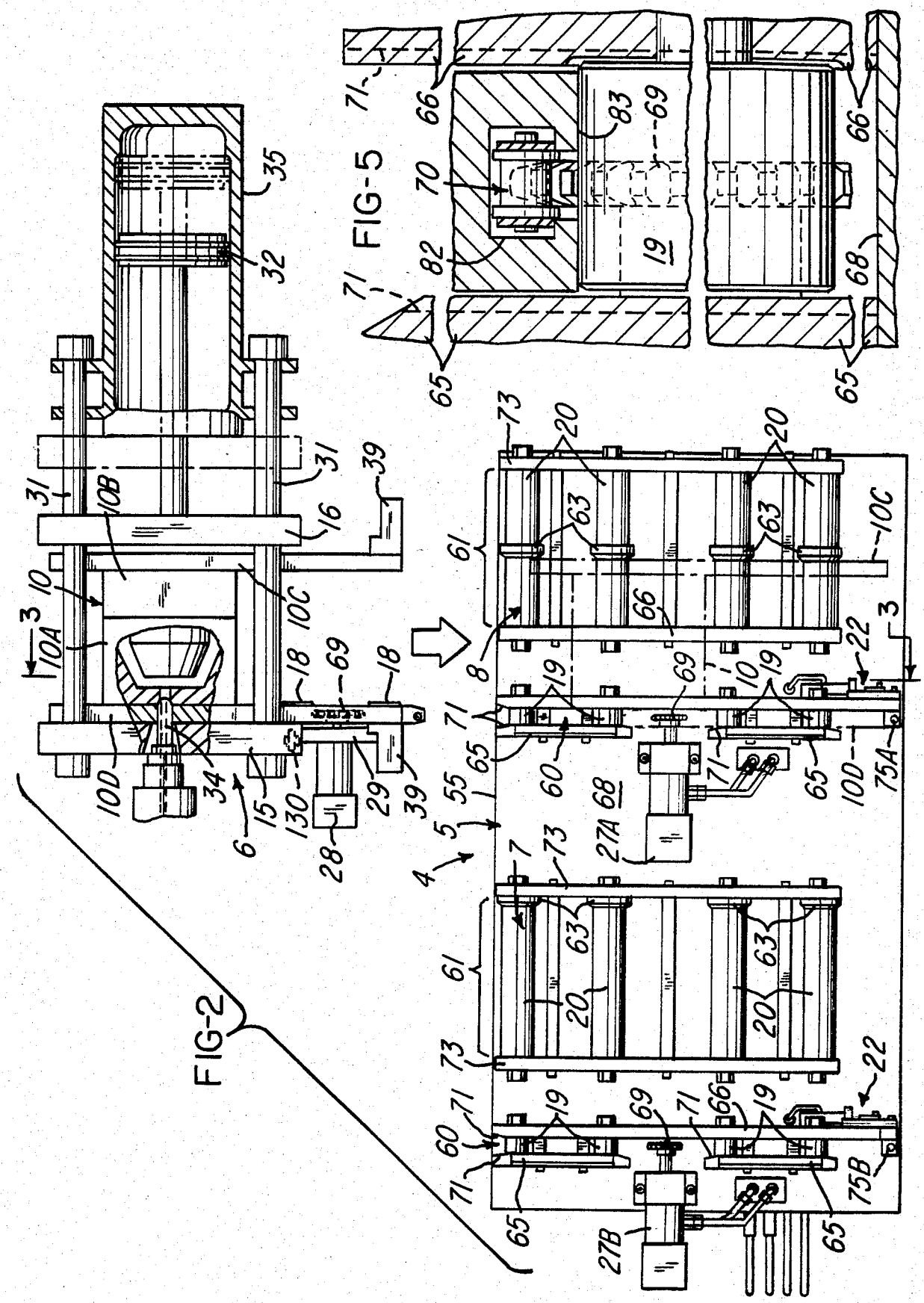

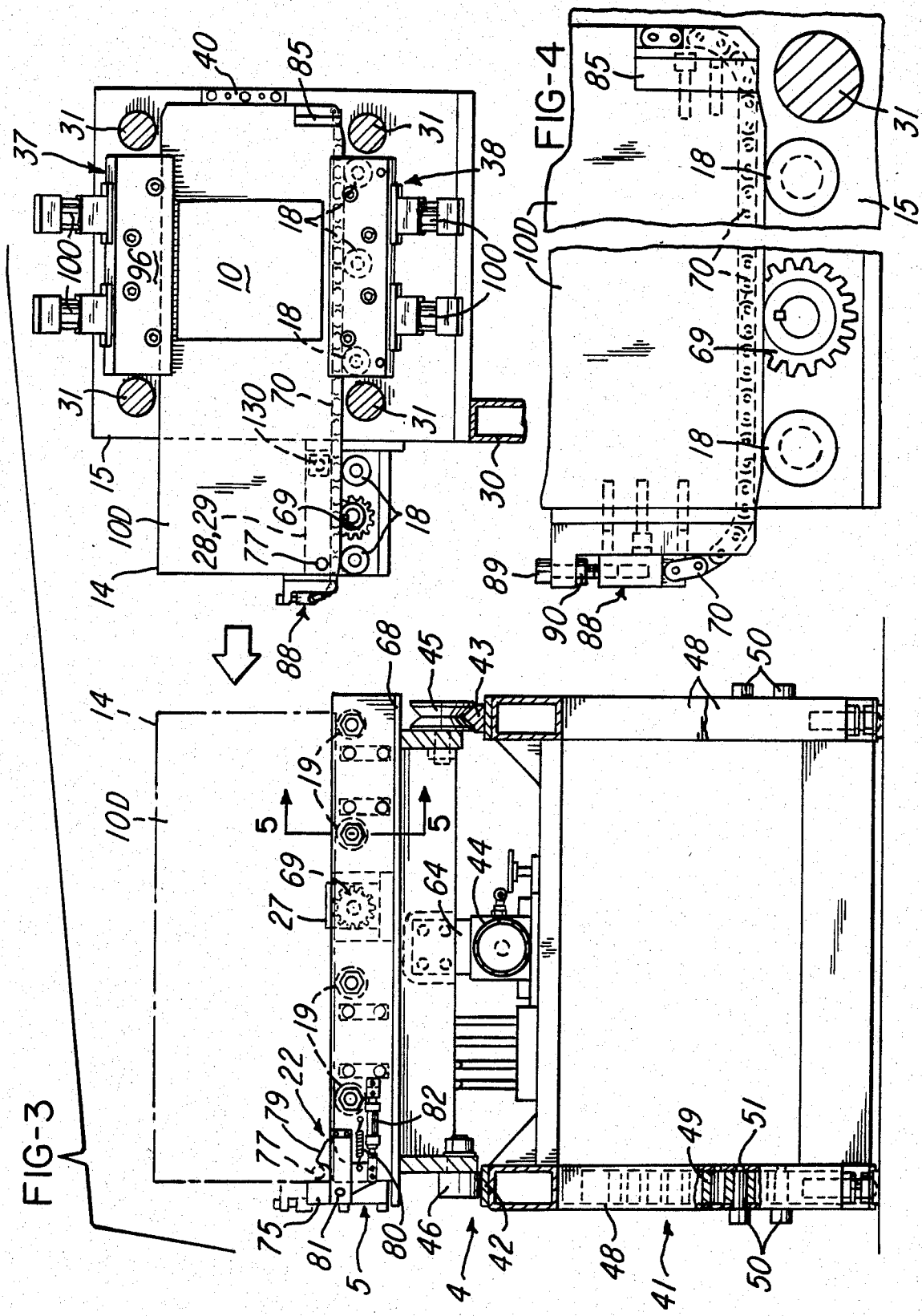

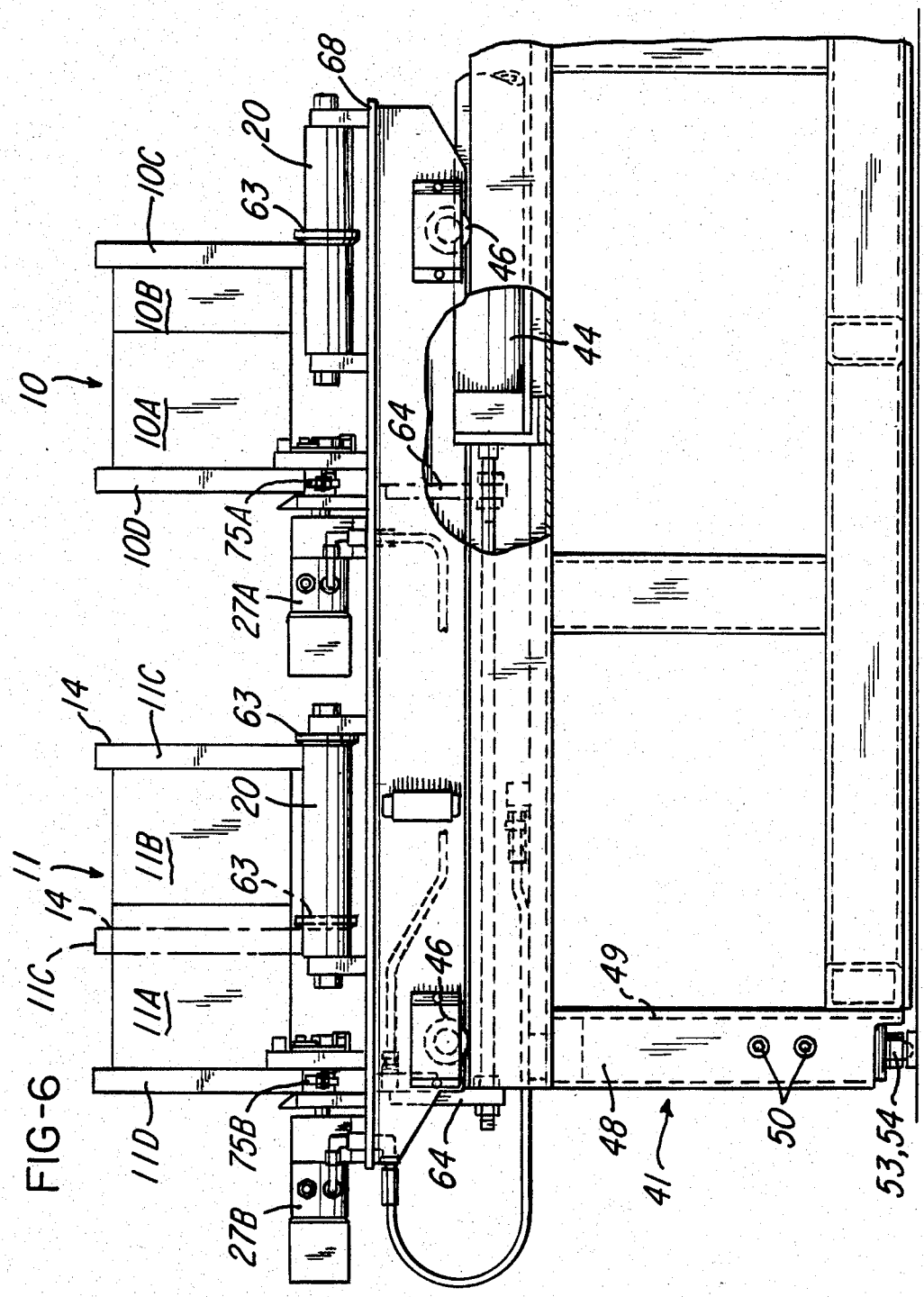

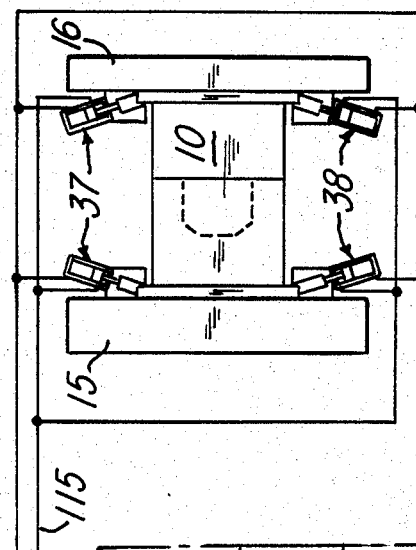
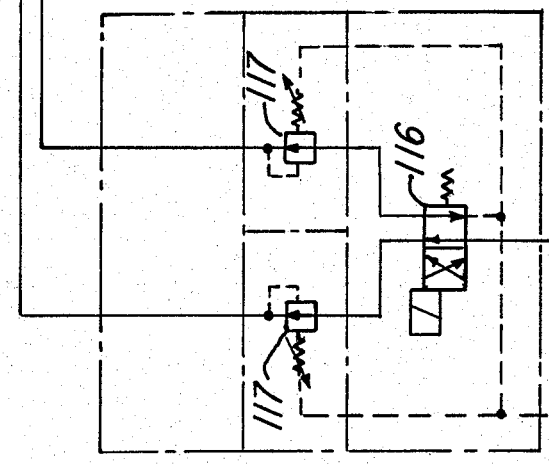
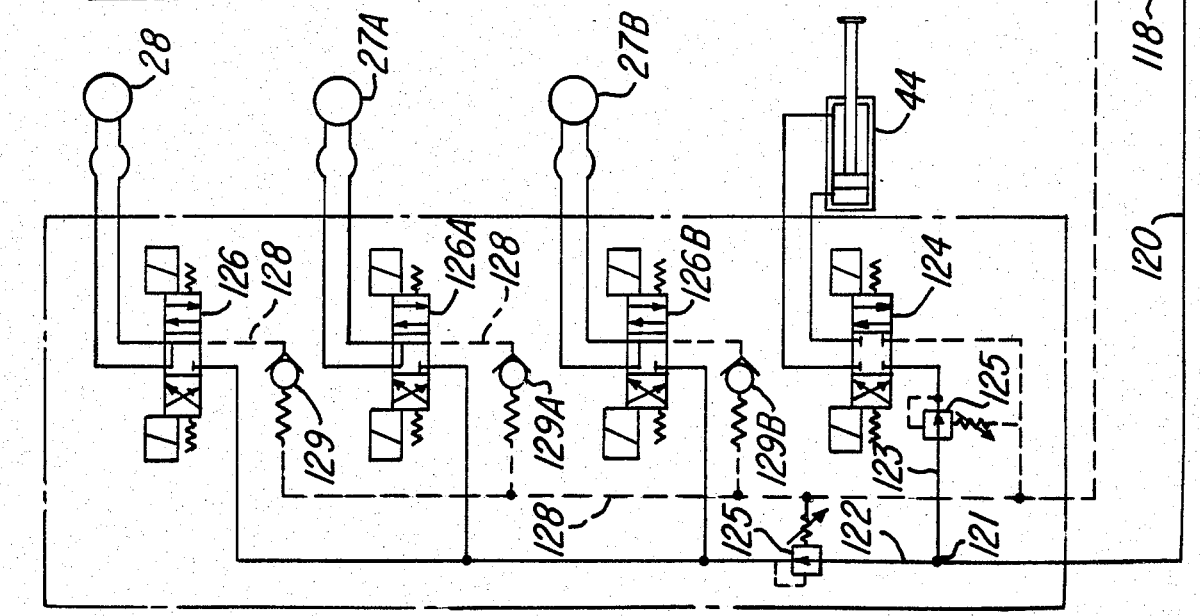
FIG-7
FIG-8

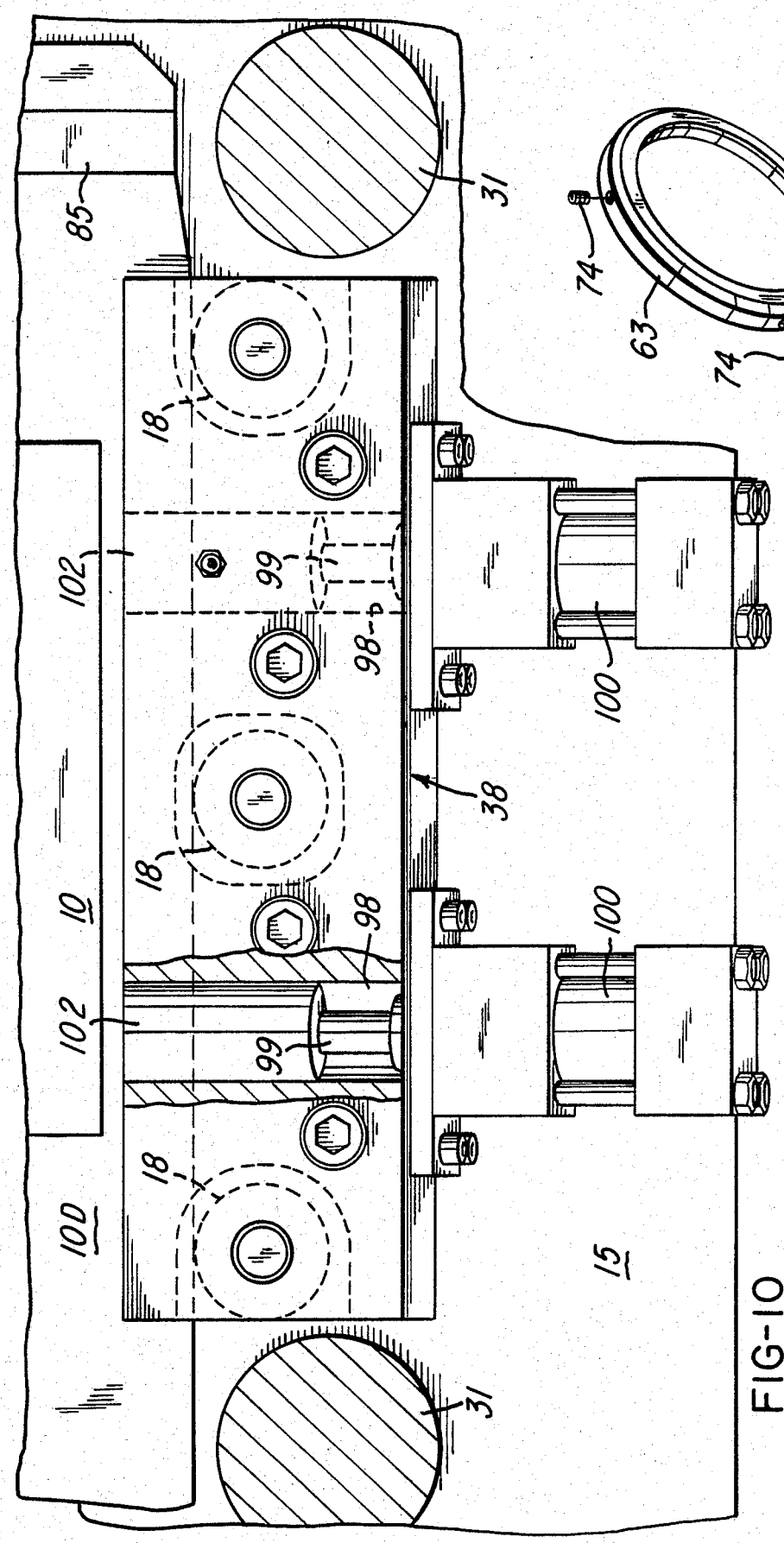

MOLD CHANGER FOR A PRESS PREFERABLY AN INJECTION MOLDING MACHINE

This invention relates to an improved mold changer for a press, preferably an injection machine. One aspect of the invention relates to an improved mold changer for an injection molding machine for molding articles from thermoplastic resin, in connection with which the invention will be described by way of example but not limitation.

Changing molds in a injection molding machine of the kind used to mold plastic articles from thermoplastic resin has been a task made difficult by the weight of the molds, the need to connect and disconnect different utilities such as compressed air, cooling water, sensors, and the need carefully to align the mold in the new machine. Also, there is the problem of handling two molds—the mold being removed and the new one being brought into service. For these and other reasons, it has been the practice to minimize mold changes and to concentrate on long production runs wherever possible.

In recent times have arisen the concepts of flexible manufacturing systems, "just in time" parts delivery, and even unmanned manufacturing. These techniques have been applied in metalcutting and shaping and involve frequent changes in what a particular manufacturing tool such as a lathe, milling machine or the like is called upon to do. This means frequent changes in what is being made to create parts that are available just in time to be assembled into a larger product. By doing this automatically, of course, unmanned manufacturing operations can take place.

The field of plastic products manufacturing is now being called upon to do similar things and therefore more frequent mold changes in molding machines are called for.

One object of the present invention is to provide a system for changing molds in an injection molding machine that includes the molding machine and a carriage mounted next to it for changing a mold assembly by moving the mold laterally out of the molding machine into a suitable work station on the carriage—or vice versa.

A described embodiment of the system provides rollers on each of the molding machine platens to support its respective part of the mold and to permit lateral movement in and out of the machine, a machine motor supported from the injection molding machine, transmission means mounted at least in part on the mold to engage the output from said machine motor, rollers suitably arranged on the carriage at a location to engage the transmission means portion which is mounted on the mold. In a presently preferred embodiment, another motor is on the carriage alignable with the first motor and the transmission means comprises a roller chain secured to the bottom of the mold assembly and a pinion driven by each of the drive means which engages the roller chain at suitable time to move the mold assembly between the carriage and its place in the injection molding machine, or vice versa as the case may be.

Other objects, advantages and features will become apparent from a reading of the following disclosures in connection with the drawings wherein:

FIG. 1 is an isometric schematic partly cut-away view of the mold assembly and cooperating parts according to the present invention;

FIG. 2 is a top view of a molding machine and carriage according to the invention;

FIG. 3 is a sectional view of the carriage, mold assembly, an injection molding machine as seen in the end elevation along section 3—3 in FIG. 2;

FIG. 4 is an enlarged end elevation illustrating the relative position of the fixed platen rollers, vane drive motor output shaft and pinion, and the chain on the bottom of the bolsters of the mold assembly;

FIG. 5 is an enlarged section showing the chain groove or cavity in the bottom of the fixed platen bolster and carriage groove as seen on section 5—5 of FIG. 3;

FIG. 6 is a side elevation of the carriage as seen from the bottom of FIG. 2, i.e. with the molding machine on the other side away from the viewer;

FIGS. 7 and 8, respectively, are schematic hydraulic and compressed air diagrams for operating systems of FIGS. 1-6;

FIGS. 9,9A, and 10 are top and side views of the roller clamp assembly illustrated more generally in the preceding figures;

FIG. 11 is an isometric assembly view of the roller flange of FIGS. 6, 12 illustrating the set screws at 90° from each other; and Throughout the drawings the same reference number refers to the same part and alphabetical suffixes, e.g. FIG. 7, are used to identify individual parts from between or among parts that are otherwise identical.

Prologue (FIGS. 1-6)

FIGS. 1-3 illustrate features of the invention which include mold loader 4 having a carriage 5 that is alongside an injection molding machine 6. The carriage illustrated has two work stations 7,8 and is moved between two positions at each of which one of the carriage stations is in register with the molding machine for either removing or applying a mold 10 (mold to be removed), 11 (new mold on carriage to be put in service).

"Mold" as used here actually refers to a mold assembly 10,11 (e.g., FIGS. 1,6) which includes two mold halves 10A,10B; 11A,11B sandwiched between two bolsters 10C,10D; 11C,11D. FIG. 1 uses mold 10 for example. This assembly presents outer contours of a flanged body. Actually, the mold halves 10A,10B are respectively bolted to a movable platen bolster 10C also called herein the plain bolster and a fixed platen bolster 10D also called herein the chain or drive bolster. A mold half is secured by conventional means such as bolting to its respective bolster. The bolsters in turn have a standard predetermined external configuration 14 (referenced only in FIGS. 3,6) so that they can mate properly and predictably with the means that effect the mold transfer and the clamping to the injection molding machine 6.

FIG. 6 references 14 twice to illustrate the range of mold thicknesses that can be accommodated: phantom lines 14 being the minimum thickness with roller length and bolster position accordingly (simularly for adjustable flange 63) and solid lines for the maximum size.

Introductory Description

This invention provides a carriage 5 mounted next to injection molding machine 6. The carriage has two work stations 7,8 so that one (7) can carry a fresh mold 11 while the other station 8 remains empty so it can receive the old mold 10 from the injection molding machine (FIGS. 2,6). The work stations of the carriage are positioned by the operator at respective positions to either receive or discharge the mold.

In operation, old mold 10 is removed from the injection molding machine by driving it laterally from its position between the platens 15,16 of the molding machine (shown as solid lines 10 in FIG. 3) to the empty station (ghost lines 14 of FIG. 3) on the work carriage 5 which has been previously positioned in register with the molding machine for such lateral movement. After old mold 10 has been removed from the machine, the carriage is moved parallel to the machine (e.g. to the left in FIGS. 2,6) to position or spot the new mold 11 in register with the machine whereupon the operation is executed in reverse, that is, the new mold 11 is moved laterally into its position between platens of the molding machine and thereafter is locked into place in the molding machine.

The lateral motion of the molds, which are quite heavy, is accomplished by providing a number of rollers 18 secured at the bottom of each platen and also rollers 19,20 at that carriage work station which has been located in alignment with the molding machine. These rollers carry the weight of the molds and actually support the molds while they are in the molding machine and the carriage respectively. The molding machine is equipped with a variety of hydraulically and pneumatically operated means (FIGS. 3,4,7,8,9,10) to clamp the mold to the respective platens. Rollers 18 preferably are revolvably supported from the roller clamp assemblies described below.

The work station of the carriage also has rollers, as noted, and a pneumatic locking means 22 to latch a received mold (the old mold from the machine or a fresh mold mounted there for subsequent transfer) into position on the carriage. The carriage also has a guide means which will be described in more detail below to assure that the heavy mold is maintained in the correct path both during changing a new mold into the machine or removing an old one from it. Importantly, this guide means is aligned with the fixed platen of the machine part by bringing the carriage into register for mold change operation.

A hydraulic vane motor 27 (FIGS. 3,4; 27A,27B in FIGS. 7,8) is provided at each carriage work station and another 28 on bracket 29 next to the fixed platen of the machine. These vane motors are coordinated so that both motors are turned on at startup and the motor sending a mold to the other device, i.e. from carriage to machine or vice versa, drives the mold assembly until after the receiving motor has engaged the mold whereupon the sending motor is turned off and freewheels and the receiving motor continues to operate thus to pull the mold into position on its device (i.e. the carriage or machine as the case may be). Vane motors are preferred because they are readily reversible and free wheel upon shutting off the flow of hydraulic fluid to them thus not impeding the operation and eliminating the need for more complex system of engaging and disengaging motor output with the mold being transferred.

The Injection Molding Machine

FIGS. 2 and 3 show a conventional hydraulic injection molding machine 6. Actually, any type of clamping means could be used in this machine, toggle or hydraulic, electric, etc. The illustrated machine (and for that matter most other current types of injection molding machines) has on base 30 four tie rods 31 to take up the clamping forces and to act as guides for the moving platen. The nuts on the end of the tie rods (also known as tension rods) bear against the fixed platen 15 through which the injection molding nozzle 34 extends into injection type engagement with mold part 10A. Actually, the nozzle extends through the fixed platen, the fixed or chain bolster 10D, and is pressed into engagement against mold 10A as illustrated in FIG. 2.

The moving platen 16 is operated by the clamping mechanism which here is shown as hydraulic piston 32 and cylinder 35. It is moved during molding between a fully opened position (phantom FIG. 2) and a clamped or molding position. During mold changing this moving platen is moved to a cracked (solid line FIG. 2) open position. Before moving to this cracked position, the mold clamps 37,38 (described further in FIGS. 7, 9 and 10) and utility manifolds 39 are disconnected from the mold, thus releasing it from being mechanically secured against the two platens. A stop 40 (FIG. 3) to locate the mold bolster right edge is on the right hand edge of the fixed platen and may also provide quick-connect utility connections, e.g., connections to air and electricity.

The Carriage

As illustrated in FIGS. 3,6 carriage 5 is mounted on stand 41 having a pair of ways 42,43 to be reciprocated by the locating cylinder 44 in the direction parallel to the molding machine tie bars 31 or the moving platen motion thereof. In order to give positive control over carriage lateral positioning it is preferred to have one of these ways 43 made of angle iron or the like—that is, a tapered top—and carriage rollers 45 to match. The other rollers 46 are cylindrical and engage a flat way.

The ways are height adjustable, preferably by a system similar to the jack stands used to support an automobile. The preferred height adjustability includes (FIGS. 3,6) hollow leg 48 conveniently of structural steel, a column 49 fitting within said leg, and at least one bolt 50 that bolts into tapped holes 51 in said column. The use of the bolt in this manner draws the column up against one side of the hollow member in which is is located and thus provides a fixed datum.

Fine tuning for elevation can be provided by a locknut and bolt 53,54 (FIG. 6) type of adjustment which is well known in the art at the bottom of each column.

The carriage 5 has a frame 55 made of structural steel and generally in the shape of a rectangle. It has at least two work stations on the carriage. The two work stations are constructed identically, hence only one will be described. Each work station is divided into a carriage groove 60 and a long roller section 61 supporting long rollers 20.

The carriage groove provides guidance and power to the chain or drive bolster 10D. The long roller section 61 provides an unpowered roller conveyor system supporting the weight of the plain bolster and assisting in the transfer of the mold 10 or 11 between the latter's positions on the carriage work station and the molding machine. Each long roller 20 has an adjustable guide 63 in the form of a movable flange or the like which is illustrated in FIGS. 2,11. Guides 63 are all moved into alignment with each other at a position where they bear against the appropriate surface or the bolster (outer one of plain bolster 10C) and coordinate the guiding function with the guide bars or ways of the carriage groove. The carriage itself, supported on the roller means is moved between its two preselected positions by a hydraulic cylinder 44 that is secured to the stand underneath the carriage. The cylinder rod is connected to the carriage itself by a depending centrally located bracket 64 as seen in FIG. 6. The stroke of this cylinder is adjusted in order to locate the carriage work stations in the correct position opposite the injection molding machine. Ordinarily, this position for each work station is when the carriage groove is aligned with the fixed platen so that the chain bolster can be moved between the two.

The Carriage Groove 60 (FIGS. 2,5)

Each carriage work station has a carriage groove 60 comprising parallel guide plates 65,66 fixedly secured to the frame of the carriage and substantially normal to the tie bars, that is aligned in the direction of mold changing movement. These plates are parallelly spaced from each other by slightly more than the thickness of the chain bolster 10D to permit the lower edge of the chain bolster to be moved freely therebetween (FIGS. 2,5,6) while at the same time maintaining the same substantially in alignment with where it would be clamped to the fixed platen 15.

A plurality of short rollers 19 (commerically available cam followers may be used) is revolvably supported between guides 65,66 with the tops of the rollers being horizontally aligned and tangent with each other as well as with the short rollers 18 mounted on the fixed platen 15 in the machine. The rollers are not driven Also, and most importantly, hydraulic vane drive 27 is supported by being secured to a carriage crossbrace 68. The pinion 69 on the motor output shaft is located centrally of the groove at an elevation such that the pinion teeth engage the chain 70 in the bottom of the bolster. Mounting of motor, pinion and guides is simpler if guide 65 is in two parts, as shown with converging lead-in tapers 71 (FIG. 5) at the entry end and similar taper on top (FIG. 5) to facilitate putting in a new mold.

The long rollers 20 are not driven but are revolvably supported between their support bars 73 on the carriage, their top surfaces in the proper datum so they are tangent with corresponding short rollers on the moving platen of the molding machine. On each of these rollers is movable guide flange 63 illustrated in FIG. 11. Flange 63 is movable to accommodate different size molds (e.g. different guide positions and mold lengths at stations 7,8). Each guide is a metal ring having a central hole of about the diameter of roller 20—a size to permit the ring to be moved along the roller 20 on which it is mounted to a selected position where it is then secured by tightening the two set screws 74. The flange is bevelled on the side which engages the outside of the plain bolster as illustrated in FIGS. 2,11 thus to guide or lead in the mold assembly. The two set screws 74 are disposed at about 90° so the ring can be secured but not be as subject to cocking.

A proximity switch 75 (shown as 75A and 75B) is in the end of each carriage groove. It announces to the system that a chain bolster 10D or 11D is located against it and that the carriage drive motor 27 (shown as 27A,27B) should be shut off. It does this, of course, when the bolster indeed does arrive at the location indicated.

At the same end of the carriage groove is the pneumatically operated latching mechanism 22 which mechanically engages a locking pin 77 (FIG. 3) on the chain bolster 10D,11D and pushes it against the terminal position in the carriage groove. This engagement takes place mechanically because the bolster locking pin 77 rides over the slope on latch member 79 (FIGS. 3,8) as the bolster moves to the left (e.g. removing mold from injection machine) as seen in FIG. 3, the latch being normally pulled into engagement by latch spring 80. Pneumatic cylinder 82 rotates latch 79 about axis 81 away from the pin 77 when desired to unlock and allow moving mold assembly 10,11 into the machine, e.g., move it to the right as viewed in FIG. 3. The compressed air system of FIG. 8 is manipulated by the operator to unlatch and move a new mold into the injection machine, as described.

The Chain Bolster (FIGS. 3,4,5)

Each chain bolster 10D,11D has a T-slot 82 cut along its bottom edge 83 as best illustrated in FIG. 5. The chain bolster actually is the driven member and contains within the T-slot roller chain 70 which engages the pinions 69 of vane motors 27,28 which drive the mold assembly 10,11 laterally between the positions in the molding machine and carriage, respectively. Roller chain 70 is a transmission or rack means and (see FIG. 5) is supported against sag by slot 82 where it can engage pinions 69 but not to sag or drag on conveyor rollers 18,19.

This roller chain extends in the slot completely across the bottom of the bolster for a length sufficient to simultaneously engage the pinions 69 of motor 28 and one of the carriage groove motors 27A or 27B. This length, or distance permits both motors pinions to drivingly engage the mold assembly during that short period of time before the sending motor is turned off. The carriage is, of course, spaced from the injection machine to achieve this. Thus is provided a mechanically disconnectable feature. Roller chain is definitely preferred for this because of its ease of engagement and disengagement with the pinions and its somewhat resilient character compared with the rigidity of a rack.

The ends of roller chain 70 are secured preferably as illustrated in FIGS. 3 and 4. Each end is secured to a machined block 85,86 by a suitable roller pin. Each block in turn is secured by bolting to a lower corner of the bolster. However, mounting block 86 includes a slack adjuster 88, having an adjusting screw 89 (and locknut 90) that positions slack adjuster block 88 to which the chain is secured.

Roller Clamp 37—FIGS. 1,9,9A,10

This device provides powerful hydraulic clamp means secured at the top and bottom of each platen to guide the mold in position and maintain it there in the course of mold changing, to support the weight of the mold, and to hydraulically clamp the mold against its respective platen in response to an appropriate hydraulic signal clamps the mold. The upper and lower clamps differ only in that the upper has no weight supporting rollers 18 there being no need for them. The clamp on the bottom, however, as seen in FIGS. 3, 9, 9A, and 10, does provide such rollers. These are preferably short rollers similar to 19 on the carriage and supported in recesses by the clamp blocks 96 along the bottom edge of the fixed and moving platens, respectively.

Each clamp assembly 37,38 includes a clamping block 96 which is secured to its respective platen. Each clamping block has a pair of guide bores 98 through which extend a plunger 99 (FIG. 9A) from hydraulic cylinders 100. Lubricator fittings and passages may connect to bore 98. On the end of each plunger is bolted or otherwise secured a clamping date 102 which has a notch 103 cut in its free end. The bolster lower edge 83 of the mold assembly 10,11 fits in notch 103 as is illustrated in FIGS. 9A and 10.

The lower clamping block 38 also supports the heavy duty rollers 18 as aforesaid.

The Carriage Latch—FIG. 8

FIG. 8 illustrates schematically the compressed air system for actuating the single acting air cylinder 82 to unlock the mold latch assembly 22 referenced above for the carriage. This system includes the supply line 108 (coming from a compressor and likely a receiver) in which are an air filter and pressure regulator unit along with an air lubricator, collectively 109. The supply line goes from there through a pair of single acting four port solenoid valves 110 connected upstream of each of the two latching cylinders 82. These are single acting cylinders where the air extends same to unlock and there is a spring 80 return. Latching member 79 is swung about pivot 81 by the air cylinder and the spring returns same.

Hydraulic System—FIGS. 7,8

Here, hydraulic pump 112 delivers pressurized hydraulic fluid, usually hydraulic oil, into the mainline 114 as illustrated by the solid lines in FIG. 7. A branch 115 from this line conveys hydraulic fluid through a single acting solenoid spring biased hydraulic valve 116, past a pressure regulator 117 in each main line, and then to the selected side of the hydraulic cylinder 37,39 part of the mold clamp. These hydraulic cylinders 37,38 are double acting and therefore received pressurized fluid on one side while releasing to tank a low pressure or exhaust fluid from the other. The solenoid valve 116, of course, directs the flow from each side of each clamp to the tank 118 and to and from the hydraulic pump. As a matter of convenience, only one bolster clamp hydraulic cylinder is illustrated in FIG. 7 at each station, it being understood that there is actually a pair of same connected in parallel with each other as should be evident from the mechanical structure shown in FIGS. 9,9A,10.

The other branch 120 transmits oil from the hydraulic pump to junction 121, the flow is split into mainline supply 122 for the various rotary vane motors 27A,27B,28 and to supply 123 and solenoid 124 for the double acting stroke cylinder 44 that positions carriage 5.

The vane motor supply includes a conventional pressure reducing valve 125 that adjusts the pressure for all vane motors 27A,27B,28 and then respective two way solenoid operated four port spring centered hydraulic flow control valves 126 and 126A,126B which direct fluid to the selected rotary vane motor 27A or 27B or while cutting it off from the others. The exhaust from the respective motors is passed through the appropriate ports in respective solenoid valve(s) 126,126A,126B to the exhaust line 128 (dotted) where it is released by a spring-loaded check 129 to the common line to tank. This construction is true for each of the three exhaust valves.

Note the three-way connections schematically shown in the main motor solenoid control valves 126,126A,126B. This permits each motor to free wheel when not receiving hydraulic power. Freewheeling is important toward preventing a braking action by not so directing the fluid. Carriage stroke positioning cylinder 44 also receives its pressurized fluid through another pressure reduction valve 125 and a double acting or two-way solenoid operated four port spring centered valve 124 but three-way connection to tank is not provided in the exhaust line because there is no need to provide for a freewheeling function.

Preferred Cycle

This describes how the proximity switches coordinate with other elements to manipulate the two-way vane motor control valves 126,126A,126B, hence the vane motors and mold assembly when moving a mold with things positioned as shown in FIGS. 2,3.

There are three proximity switches 130,75A,75B the latter two (75) being at corresponding locations in the respective work stations on the mold carriage. Switch 130 is disposed in a fixed position on the injection molding machine, preferably on bracket 29 slightly to the right in FIG. 3 of motor 28.

The proximity switch 130 on the injection molding machine does the following things when the mold is being removed from the molding machine to station 8 of the carriage: first, this proximity switch responds to the absence of the bolster or passing of the right hand edge (as viewed in FIG. 3) of the bolster 10D by shutting off the flow of hydraulic oil to the machine vane motor 28 which it does by closing solenoid valve 126; meanwhile, carriage vane motor 27A has also been operating and it continues to operate, solenoid valve 126A having been opened for that purpose for th.eempty work station—8 as shown—which is positioned to receive the mold from the molding machine. Vane motor 28 freewheels after its oil is turned off. The proximity switch 75A in the end of the selected carriage groove is activated when the left hand edge of the bolster reaches its locked in position—dotted lines of FIG. 3—and positions the just-opened solenoid 126A to shut off the supply of fluid to carriage vane motor 27A.

Now, if a new mold 10 is to be moved from, e.g., work station 7, on the carriage into the molding machine 6, the operator operates cylinder 44 to move station 7 into register with the molding machine. Then appropriate air control valve 110B (FIG. 8) is actuated which in turn fires the appropriate single acting air cylinder 82B to unlatch the carriage latch 22,79 associated therewith, then unclamps cylinders 37,38 (FIG. 7). At about the same time, hydraulic fluid is directed through solenoid control valves 126B and 126 to carriage vane motor 27B and motor 28 which this time run in the opposite direction of rotation from what was described above thus to drive the bolster and mold assembly to the right as seen in FIG. 3. This driving action continues until the right hand edge of the bolster reaches machine proximity switch 130 at about which time the carriage motor 27B is turned off. Use of vane motors permits freewheeling by that vane motor engaged with/by chain 70 (through its pinion 69) but not driving, even though and while the other vane motor is driving.

Following by way of example is a sequence of events to remove an old mold from the injection machine to the carriage and then to move a new mold from the carriage into the injection machine:

Locate collars 63 in accordance with mold assembly size. Close mold by moving platen 16 to full clamp close position. Unlock mold clamps 37,38 (FIGS. 3,7,9,9A). Open partially by moving platen 16 to mold change position (dotted FIG. 2). Retract injection unit sled to withdraw nozzle 34. Retract ejectors so nothing extends into mold assembly 10. Open safety devices not shown such as guard cages or windows or a mold gate.

Unload mold (see above) from injection machine to latch position 77 at end of groove. Adjust platen 15,16 spacing (e.g. move platen 16) and make other adjustments to receive the new mold from the carriage, e.g. for mold assembly size, daylight required, etc. which can be done manually. Traverse carriage to position new mold by stroking cylinder 44. If not done before, position clamp 16 open or close to about new mold size (of course, the platen opening is slightly larger than the mold plus bolster dimension) load position due to different dimensions of new mold.

Load new mold (latch 22 will release first) until bolster hits (FIG. 3) stop 40 on platen 15 at which time plunger type limit switches (not shown) announce this event and shut off vane motor 28. Mold is now in clamp area. Close clamp platen 16 fully on mold assembly 10. Lock mold clamps 37,38. Position nozzle 34 against mold. Reactivate safety devices such as mold gate.

Although it is preferred to use proximity switches that switch in response to metal at a selected position, it is possible to use limit switches of known type that respond to physical contact to exercise a switch function.

All of the switching for the above sequences may be done manually by one step at a time manipulating switches or the sequence may be programmed into a programmable controller or the like to be carried out automatically.

What is claimed is:

1. A mold changing apparatus for use in changing molds on a horizontal plastic injection molding machine where the mold has a pair of depending spaced-apart weight supporting members called bolsters protruding at least from the lower surface thereof, the injection molding machine has at least a base on which is supported a fixed platen and a moving platen between which platens said mold is to be inserted or removed, said apparatus comprising
    platen roller means supported along the lower portion of each platen to support its respective bolster;
    rack means disposed along said lower surface of at least one of said bolsters;
    a machine motor with a pinion output supported to engage said rack means;
    a mold carriage with a pair of work stations thereon and disposed along said injection molding machine and supported for movement parallel to the motion of said moving platen; and
    at each work station
    carriage roller means supported on said carriage to receive and rollingly engage said bolsters;
    said platen and carriage roller means disposed to permit bolster and mold motion lateral of said machine; and
    a carriage motor with pinion output supported on said carriage within said carriage rollers to engage said rock means on said bolster by the last said pinion;
    said rack means being engageable during mold changing by said machine motor pinion and one of said carriage motor pinions serially and the bolster and mold driven laterally between said machine and said carriage.

2. Mold changing apparatus in accordance with claim 1 wherein the parts are located so that said rack means remains engaged with said machine motor pinion as long as said mold is disposed in said injection molding machine and is disengaged from said pinion upon said bolster being moved out of said machine and into initial engagement with said carriage motor pinion and vice versa, said two pinions being spaced apart by slightly less than the width of said bolster.

3. Apparatus in accordance with claim 1 wherein said rack means includes a T slot formed along the bottom edge of said bolster and also comprises a roller chain disposed within said T slot.

4. Apparatus in accordance with claim 3 wherein said rack means includes a means for adjusting the slack in said roller chain.

5. Apparatus in accordance with claim 1 wherein at least one of said motors comprises a vane motor.

6. Apparatus in accordance with claim 1 wherein all said motors comprise a hydraulic vane motor.

7. Apparatus in accordance with claim 1 wherein said carriage means includes a frame assembly, means supporting and guiding said frame assembly for motion parallel to that of said moving platen;
    said carriage having at least two work stations so that one may be empty to receive a mold to be removed from said machine and one may concurrently be loaded with a fresh mold to be placed in said machine upon said removal; and
    stroke means for positioning said carriage with one work station selectively positioned to receive the mold from said molding machine, the roller means on said carriage and that on said injection molding machine being aligned in substantially the same datum for receiving and supporting said bolsters.

8. Mold changing apparatus according to claim 7 wherein each work station has a carriage groove defined between a pair of spaced apart linear guides, said carriage motor pinion output being disposed within said guides, the spacing of said guides being such as to guidingly receive that bolster supporting said rack.

9. A horizontal plastic injection molding apparatus that includes an injection molding machine and a mold loader which apparatus comprises
    an injection molding machine having a base and a fixed platen and a moving platen mounted on said base, the moving platen being mounted to move longitudinally of said machine;
    upper and lower bolster clamps secured to each of said platens;
    roller conveyor means supported on one of said base, at least one of said platens, and each of said platens with the tops of the roller means disposed along a bolster datum for moving bolsters and molds laterally of said machine;
    a moving bolster and a fixed bolster each held on said moving and fixed platens, respectively, by said clamps, the lower edge of each bolster being disposed along said datum;
    rack means disposed along the narrow lower edge surface of said fixed bolster above said datum so that rack means does not engage said conveyor means;
    a mold loader carriage disposed along but spaced from one of said mold loader, having thereon pair of work stations each for receiving from said machine a mold assembly containing such bolsters and for loading a similar assembly containing such bolsters by the aforesaid motion lateral of said machine;
    means for moving said carriage longitudinally parallel to the direction of motion of said moving platen; and first motor means and a pair of second motor means, respectively disposed on said machine and at each work station on said carriage, for engaging said rack means and spaced apart by a distance not greater than the length of said rack means.

10. A plastic injection molding apparatus that includes in combination therewith an injection molding machine and a mold loader in accordance with claim 9 and further comprising:

both said motor means being vane motors.

11. A plastic injection molding apparatus that includes an injection molding machine and a mold loader all in accordance with claim 9 and which further comprises said rack means including a T-slot formed along the bottom edge of said bolster and includes a roller chain disposed therewithin and secured to said bolster.

12. A plastic injection molding apparatus that includes in combination therewith an injection molding machine and a mold loader in accordance with claim 9 and further comprising:

each work station on said carriage frame having roller conveyor means disposed with axes substantially parallel to the aforesaid mold opening axis so as to receive and convey said mold assembly substantially laterally of said carriage;

a movable collar on at least one of the rollers comprising said roller conveyor means; and a groove defined by a pair of spaced-apart guides at one end of said roller conveyor, a pinion disposed within said groove a vane motor for driving said pinion, and a latch at that end of the groove most remote from the molding machine with which the same is to be associated.

13. A plastic injection molding apparatus that includes in combination therewith an injection molding machine and a mold loader in accordance with claim 12 and further comprising each said work station having short rollers disposed within said groove, said roller conveyor means and short rollers having their upper surfaces substantially in the datum or plane in which respective ones of said bolsters are intended to be disposed on said machine.

14. A carriage apparatus for use in changing a mold assembly on a plastic injection molding machine where the mold assembly has a pair of depending spaced-apart weight supporting bolsters between which are mold members defining the mold cavity, said carriage comprising a generally rectangular frame assembly;

at least two similarly built work stations supported on said frame assembly;

means underneath said frame for moving said carriage substantially horizontally and substantially parallel to the direction of motion in which molds on said machine may be opened;

each work station on said carriage frame having roller conveyor means disposed with roller axes substantially parallel to the aforesaid mold opening direction so as to receive and convey said mold assembly substantially laterally of said roller means;

a movable collar on at least one of the rollers comprising said roller conveyor means; and a groove defined by a pair of spaced-apart guides at one end of said roller conveyor, a pinion disposed within said grooves, a vane motor for driving said pinion, and a latch at that end of the groove most remote from the molding machine with which the same is to be associated.

15. A carriage according to claim 14 further comprising each said work station having short rollers disposed within said groove, said roller conveyor means and short rollers having their upper surfaces substantially in the datum or plane in which respective ones of said bolsters are intended to be disposed on said machine.

16. A carriage according to claim 15 further comprising means connected to said carriage frame for moving the same to thereby position a predetermined said work station at a preselected location in register with the mold assembly.

17. A carriage apparatus in accordance with claim 14 further comprising:

ways supported at an elevation such as to keep the roller conveyor means in a plane with the injection molding bolster, height adjusting means to so position said ways;

said means for moving comprising wheels at least one having an approximately V-shaped configuration, at least one of said ways having a matching V-shaped configuration whereby alignment may be realized; and said V-shaped means being on the side of said carriage assembly intended to be disposed adjacent said injection molding machine.

18. A carriage assembly according to the claim 14 wherein said positioning means comprises a cylinder and plunger assembly one end of which is connected to a fixed support and the other end of which is connected to said carriage.

* * * * *